(12) United States Patent
Chan et al.

(10) Patent No.: US 7,118,080 B2
(45) Date of Patent: Oct. 10, 2006

(54) MULTI-FUNCTIONAL ADJUSTABLE COMPUTER SUPPORT STAND

(76) Inventors: Chin-chung Chan, 4F., No.131-18, Sec. 2, Keelung Rd., Sinyi District, Taipei City 110 (TW); Chun-Hsiung Lu, 3F., No.8, Alley 63, Lane 12, Sec. 3, Bade Rd., Songshan District, Taipei City 105 (TW)

( * ) Notice: Subject to any disclaimer, the term of this patent is extended or adjusted under 35 U.S.C. 154(b) by 67 days.

(21) Appl. No.: 10/900,302

(22) Filed: Jul. 28, 2004

(65) Prior Publication Data

US 2006/0022096 A1   Feb. 2, 2006

(51) Int. Cl.
*A47K 1/04* (2006.01)

(52) U.S. Cl. .................. 248/129; 248/161

(58) Field of Classification Search .......... 248/149, 248/150, 154, 157, 161, 176.1, 178.1, 179.1, 248/186.1, 186.2, 176.3, 131, 132, 133, 145, 248/447, 449, 451, 460, 462, 458, 918, 919
See application file for complete search history.

(56) References Cited

U.S. PATENT DOCUMENTS

| | | | | |
|---|---|---|---|---|
| 171,260 A * | 12/1875 | Berg | ........................... | 248/451 |
| 696,993 A * | 4/1902 | Mills | ........................... | 248/462 |
| 3,104,491 A * | 9/1963 | Sparkman | ................... | 248/449 |
| 4,165,856 A * | 8/1979 | Wiseheart | ................... | 248/449 |
| 4,365,561 A * | 12/1982 | Tellier et al. | ................... | 108/7 |
| 4,638,969 A * | 1/1987 | Brown | ..................... | 248/122.1 |
| 4,819,902 A * | 4/1989 | Wenger et al. | ............. | 248/460 |
| 5,351,927 A * | 10/1994 | Howell | .................... | 248/444.1 |
| 5,400,993 A * | 3/1995 | Hamilton | ................ | 248/279.1 |
| 5,580,024 A * | 12/1996 | Briee | .......................... | 248/444 |
| 5,615,856 A * | 4/1997 | Simington | ................... | 248/452 |
| 5,671,091 A * | 9/1997 | Monroe et al. | ............. | 359/635 |
| 5,671,900 A * | 9/1997 | Cutler | ........................ | 248/451 |
| 5,797,568 A * | 8/1998 | Canton Gongora et al. | ....................... | 248/122.1 |
| 5,908,207 A * | 6/1999 | Wilson | ........................ | 281/45 |
| 5,918,841 A * | 7/1999 | Sweere et al. | ......... | 248/123.11 |
| 5,979,856 A * | 11/1999 | Hsu | ........................ | 248/441.1 |
| 5,979,857 A * | 11/1999 | Holm | ......................... | 248/451 |
| 6,394,402 B1 * | 5/2002 | Coonan et al. | ......... | 248/123.11 |
| 6,672,556 B1 * | 1/2004 | Hsia | ............................ | 248/447 |
| 2003/0160144 A1 * | 8/2003 | Guadagnini | ................ | 248/447 |

* cited by examiner

*Primary Examiner*—A. Joseph Wujciak, III
(74) *Attorney, Agent, or Firm*—Troxell Law Office, PLLC (57) ABSTRACT

The present invention discloses a multifunctional adjustable computer support stand designed for disabled users. The present invention includes a movable base used to accommodate a computer host; two swing rods, formed on the bottom of the base; a retractable rod; a rotation member able to rotate to any desired angle; a support rod pivotally connected with the rotation member, including a shaft rod extending form the one end of the support rod; a rotatable base member, including a left U-shaped frame and a right U-shaped frame used to hold a monitor; an adjustment frame, U-shaped used to firmly hold a keyboard.

14 Claims, 12 Drawing Sheets

FIG. 12

MULTI-FUNCTIONAL ADJUSTABLE COMPUTER SUPPORT STAND

BACKGROUND OF THE INVENTION

1. Field of the Invention

The present invention relates to a computer support stand wherein some portions are adjustable and rotatable to unspecific angles so as to match the combined use of a computer host, a display and a keyboard, which is more convenient for disabled users.

2. Description of the Prior Art

Generally, the traditional computer desk used to provide the space for the arrangement of a computer host, a display, a keyboard, a mouse and even a printer so as to achieve the convenience of users.

Although, this kind of computer desk can solve the problem regarding the space accommodating a plurality of computer apparatuses and thus beautifies the space and provides visual delight, disabled users or the sick persons lying on sickbeds are unable to use it. Therefore, to let the sick persons lying on beds be able to use a computer normally is the purpose of the present invention In order to resolve the above problem, an improved computer frame is disclosed in the present invention.

On the other hand, the lives of sick persons who have been lying on sickbeds for a long time are quite boring except the time for rehabilitation. In this condition, if the sick persons lying on sickbeds can use computers freely and easily to kill time, it is believed that this is helpful to make the sick persons recover more quickly.

SUMMARY OF THE INVENTION

Accordingly, the present invention provides a multifunctional adjustable computer support stand, which aims to satisfy disabled users. Through specially designed structure of the multifunctional adjustable computer frame of the present invention, according to specific requirements of disabled users, parts of the present invention is adjusted so as to make the users use a computer easily and conveniently.

The present invention discloses a multifunctional adjustable computer support stand designed for disabled users. The present invention includes a movable base used to accommodate a computer host; two swing rods, formed on the bottom of the base; a retractable rod; a rotation member able to rotate to any desired angle; a support rod pivotally connected with the rotation member, including a shaft rod extending form the one end of the support rod; a rotatable base member, including a left U-shaped frame and a right U-shaped frame used to hold a monitor; an adjustment frame, U-shaped used to firmly hold a keyboard.

DESCRIPTION OF THE PREFERRED EMBODIMENT

Figure 1:
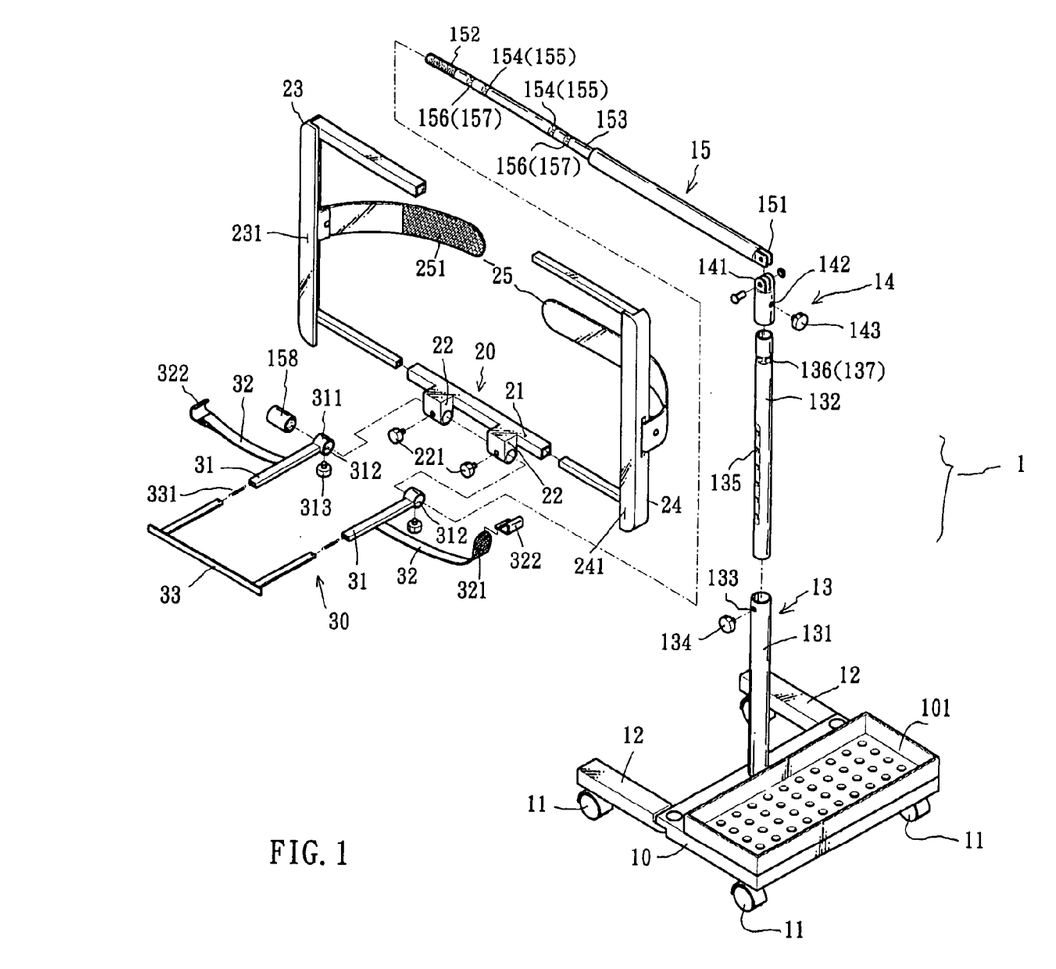
FIG. 1 is an exploded perspective view of the preferred embodiment of the invention.
Figure 2:
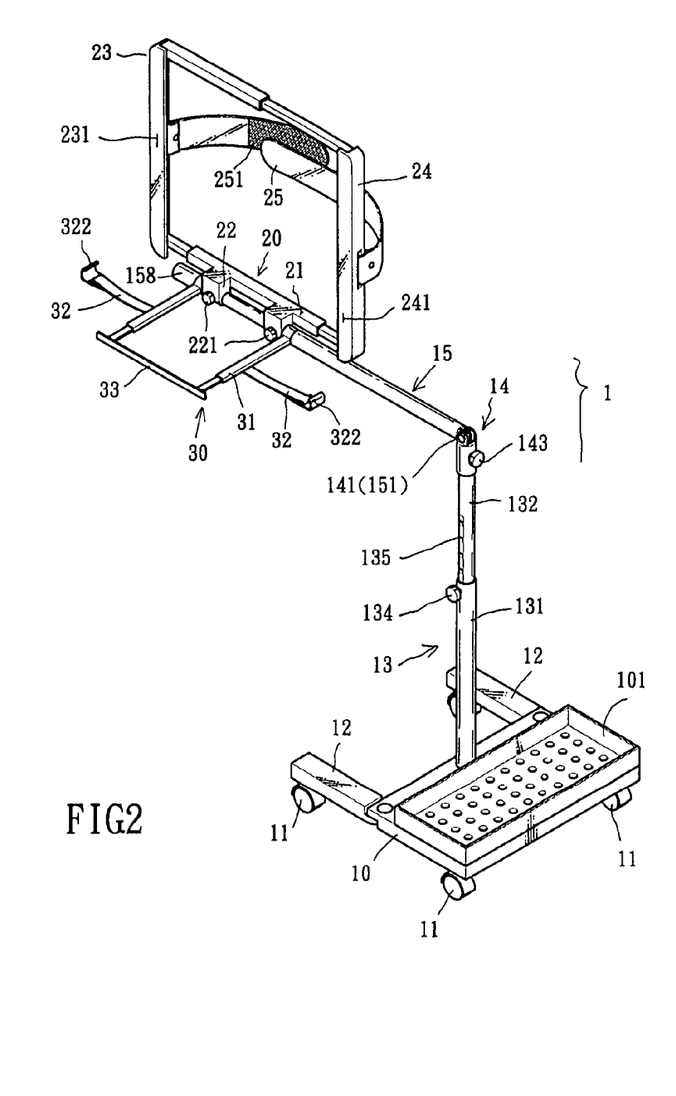
FIG. 2 is a perspective view of the preferred embodiment of the invention.
Figure 3:
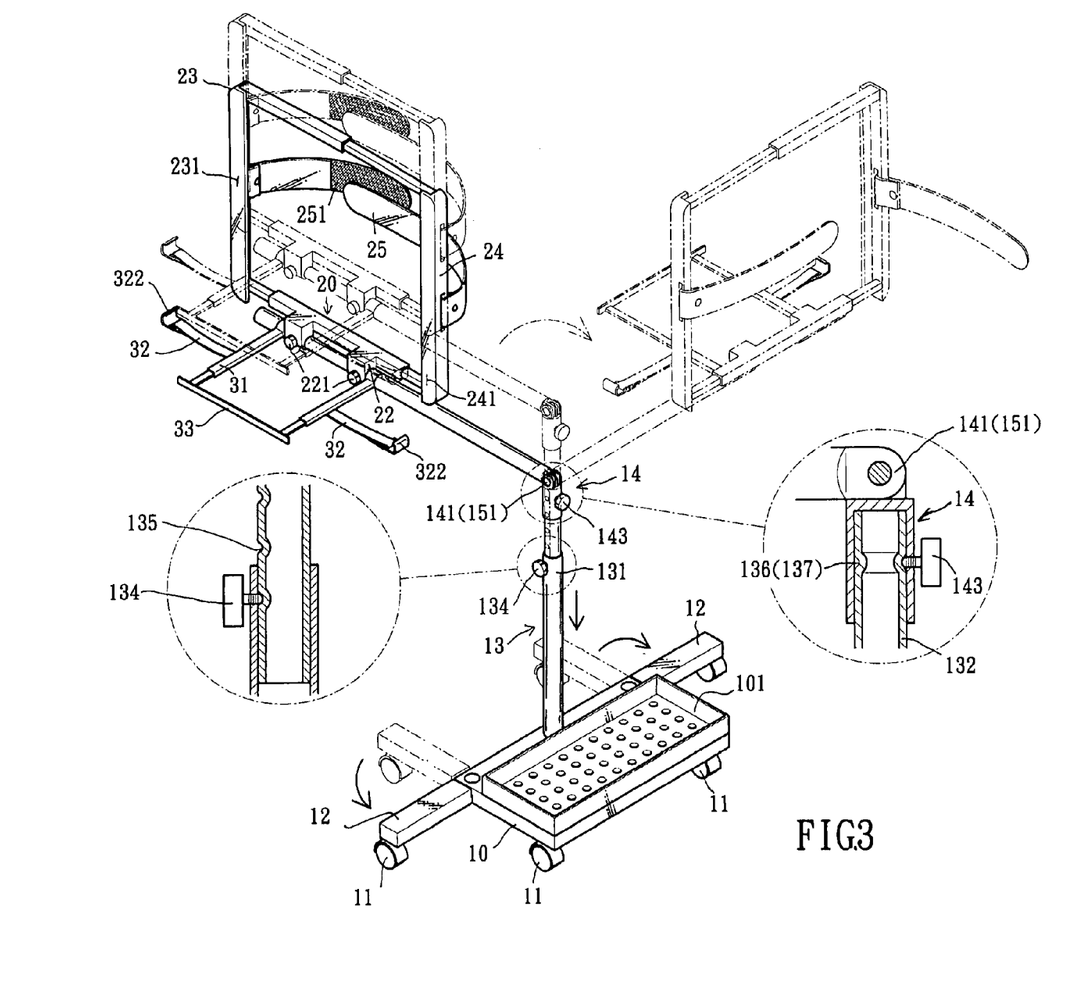
FIG. 3 is a perspective view of the preferred embodiment of the invention illustrating how some parts of the present invention work.

Referring to FIG. 1 and FIG. 2, the present invention includes a base 10 having an accommodating trough 110 used to accommodate a computer host 40, a pair of rolling wheels 11 formed on corners of the bottom surface of the base 10, and two swing rods 12 pivotally connected with opposite sides of the bottom surface of the base 10. The swing rods 12 also have another pair of rolling wheels 11 formed on the bottom ends. In this way, the base 10 can be moved casually can easily without the limitation of interior space or other goods. Further, the present computer support stand includes a retractable rod 13 including a first rod 131 and a second rod 132 passing through the first rod 131. One end of the second rod 132 is inserted into the first rod 131 and thus the second rod 131 is movable in the inner of the second rod 132. There is a through hole 133 formed and a screw 134 provided on one end of the first rod 131. In addition, there are several shallow indentations 135 sequentially formed on the surface of second rod 132. Through fixing the screw 134 passing the through hole 133 and against one of the shallow indentations 135, the retractable rod 13 can be adjusted to the desired length as shown in FIG. 3.

There is a positioning ring 136 including several shallow indentations 137 formed on one terminal of the second rod 132. One end of the second rod 132 is inserted into the inner of a rotation member 14 having a pivot 141. A support rod 15 is pivotally connected with the pivot 141 of the rotation member 14. There is a positioning hole 142 formed on the surface of the rotation member 14, which correspond to the positioning ring 136. Through a screw 143 passing through the positioning hole 142, the rotation member 14 can be fixed on one of the shallow indentations 137 of the positioning ring 136. That is, the rotation member 14 can be rotated freely and be positioned by the screw 134, as shown in FIG. 3.

Figure 4:
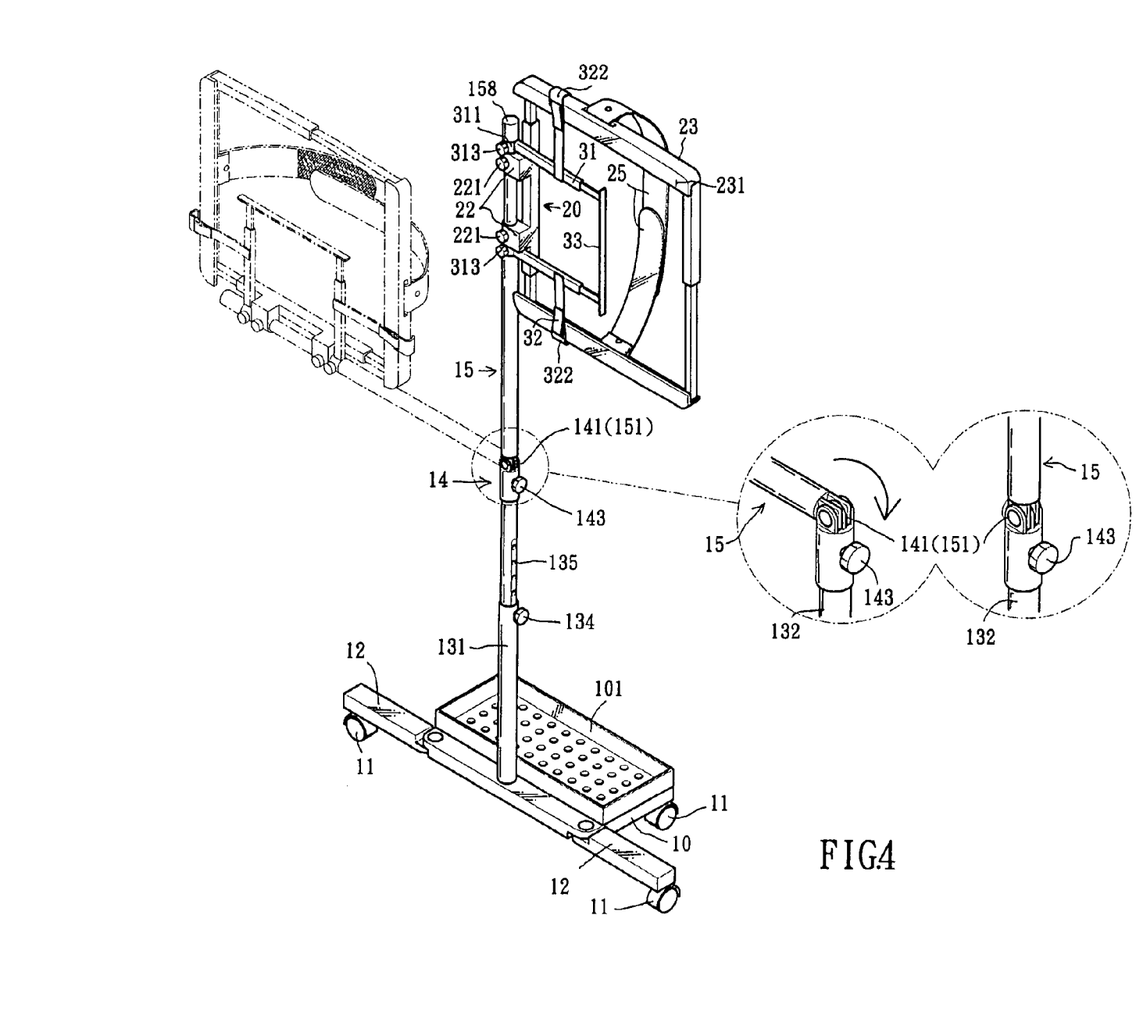
FIG. 4 is also a perspective view of the preferred embodiment of the invention illustrating how some parts of the present invention work.
Figure 5:
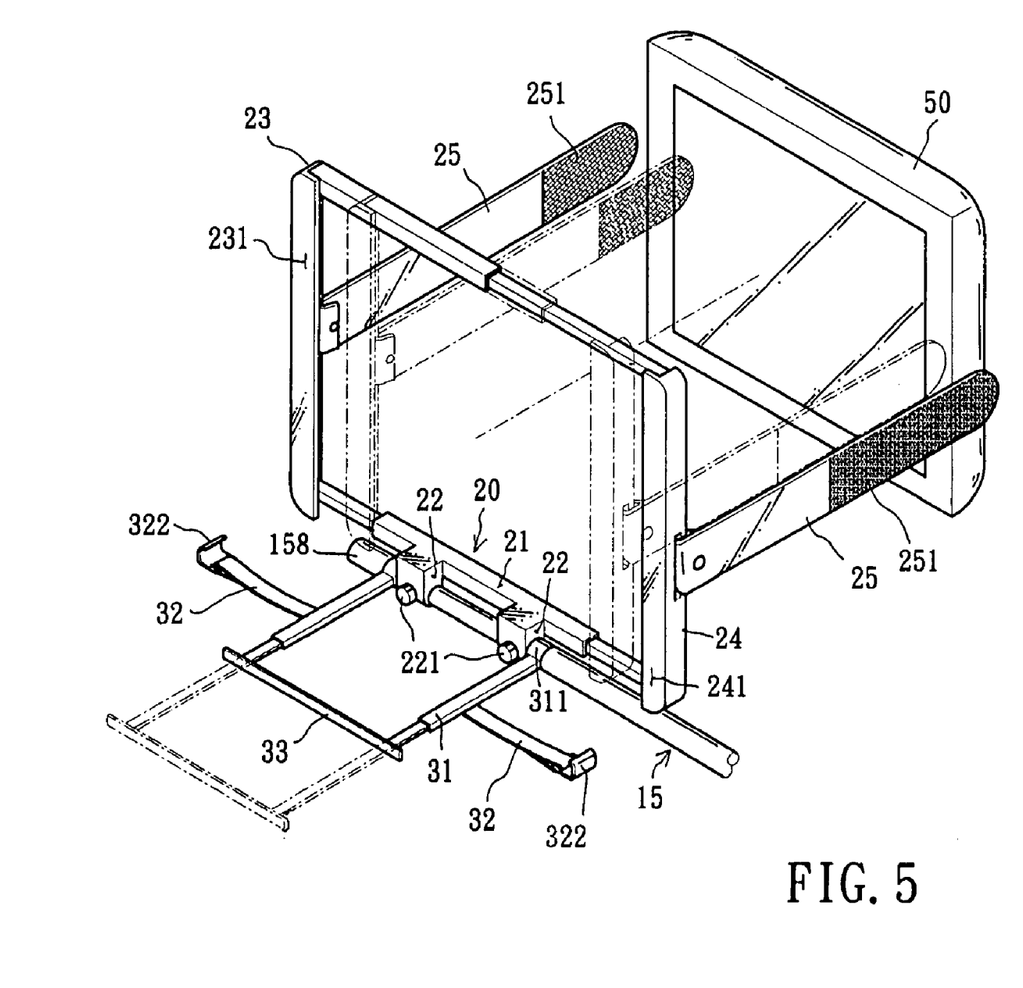
FIG. 5 is a perspective view of the preferred embodiment of the invention illustrating how a rotatable base member hold and match a monitor.

The support rod 15 includes a first end 151 and a second end 152 having a thread formed thereon. The first end 151 of the support rod 15 is pivotally connected with the pivot 141 of the rotation member 14. Meanwhile, through the rotation member 14, the support rod 15 is able to rotate with respect to the first rod 135, as shown in FIG. 3 or FIG. 4. There is a shaft rod 153 extending form the one end of the support rod 15. Three are two sets of inner fillisters 154 and two sets of outer fillisters 156 formed on the surface of the shaft rod 153, respectively. There are several shallow indentations 155 and shallow indentations 157 formed in the fillisters 154 and the outer fillisters 156, respectively. There is a rotatable base member 20 which is limited and positioned by a bolt 158. The rotatable base member 20 includes a longer hollow portion 21 which is adjacent to two separated shorter hollow portions 22 used to let the shaft rod 153 pass through them and correspond to the two sets of inner fillisters 154. Screws 221 passing through the two separated shorter hollow portions 22 can be against the shallow indentations 155 of the inner fillisters 154. In this way, the rotatable base member 20 can be rotated, fixed and positioned. Further, one end of a left U-shaped frame 23 and one end of a right U-shaped frame 24 are inserted into the longer hollow portion 21, respectively, so that the distance between the right U-shaped frame and the left U-shaped frame can be adjusted to match a monitor. The left U-shaped frame 23 and the right U-shaped frame 24 further include respective vertical flange portions 231 and 241 formed on the vertical portions, respective upper horizontal portions, respective lower horizontal portions and adjustable belts 25. The two belts 25 are connected with each other by fasteners 251. Furthermore, the upper horizontal portions of the left U-shaped frame 23 and the right U-shaped frame 24 are connected with each other. On the other hand, both of the lower horizontal portions of the left U-shaped frame 23 and the right U-shaped frame 24 insert into the longer hollow portions 21. In this way, the distance between the left U-shaped frame 23 and the right U-shaped frame 24 can be adjusted so as to match the dimension of a monitor 50, as shown in FIG. 5.

Figure 6:
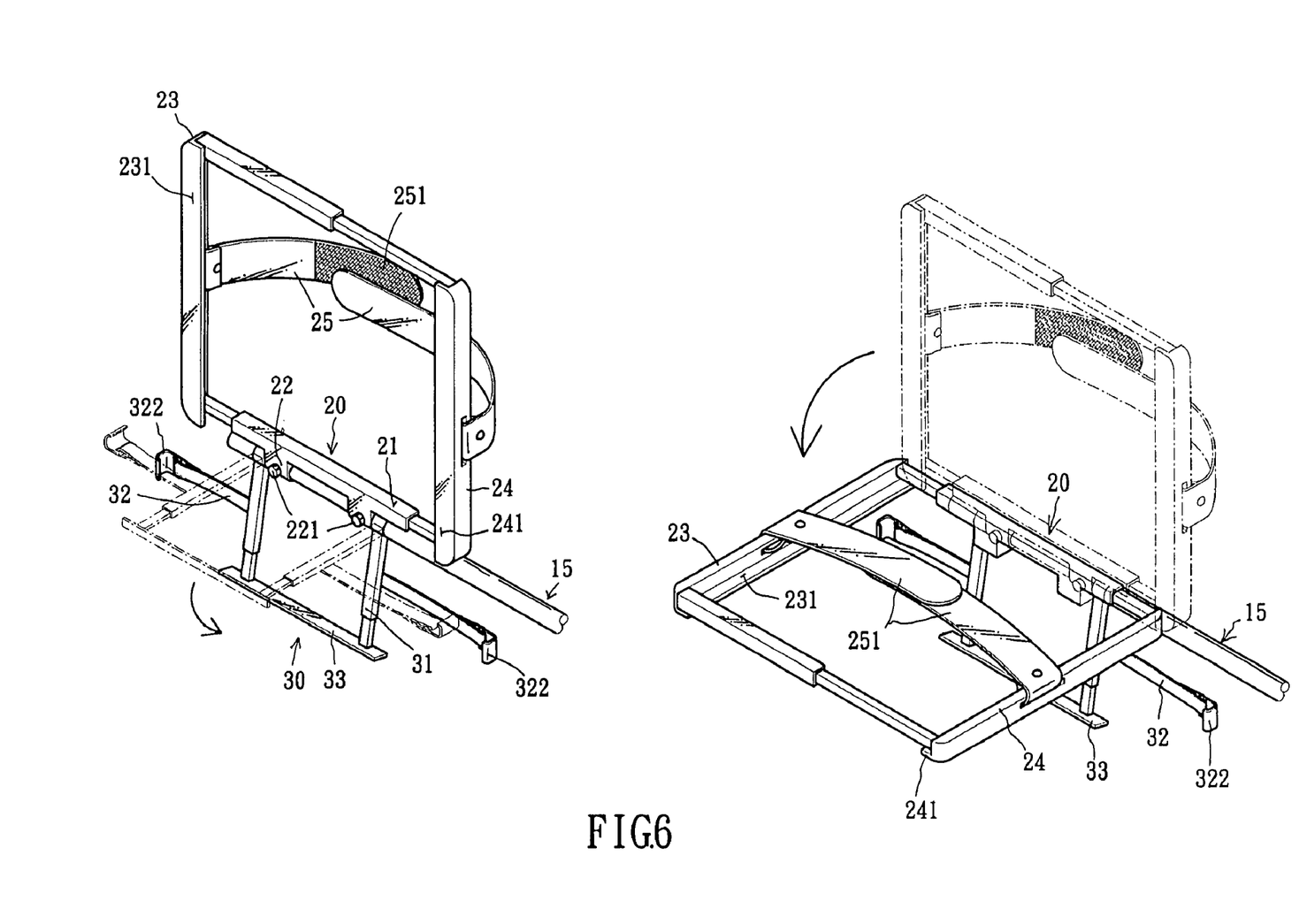
FIG. 6 is a perspective view of the preferred embodiment of the invention illustrating a practical situation of the present invention.

The shaft rod 153 passes through both of the rotatable base member 20 and an adjustment frame 30 which is U-shaped and includes two vertical rods 31. There is sleeve portion 311 formed on one end of the vertical rod 31, which is used to accommodate the shaft rod 153. Besides, the two sleeve portions 311 correspond to the outer fillisters 156 on the shaft rod 153. There are holes 312 formed on the surface of the sleeve portion 311 and screws 313 provided. Via the screws 313 passing through the holes 312 and the shallow indentations 157 formed in outer fillisters 156, the adjustment frame 30 can be adjusted to a desired angle and then fixed. There is a fillet 32 formed on each of the vertical rods 31. The fillet 32 includes a holder 322 which connected with a fastener 321 so that the length of the fillet 32 is adjustable. There is a lateral limit member 33 inserting into the opposing ends, far away from the sleeve portions 311, of the vertical rods 31. Further, there is a limit spring 331 provide in the inner of the vertical rods 31 used to provide the limit member 33 with flexibility. When a keyboard 60 is placed on the adjustment frame 30, the two sides of the keyboard 60 can be held by the holder 321 and the front end of the keyboard 60 can be held by flexibility of the limit member 33, as shown in FIG. 6.

Figure 7:
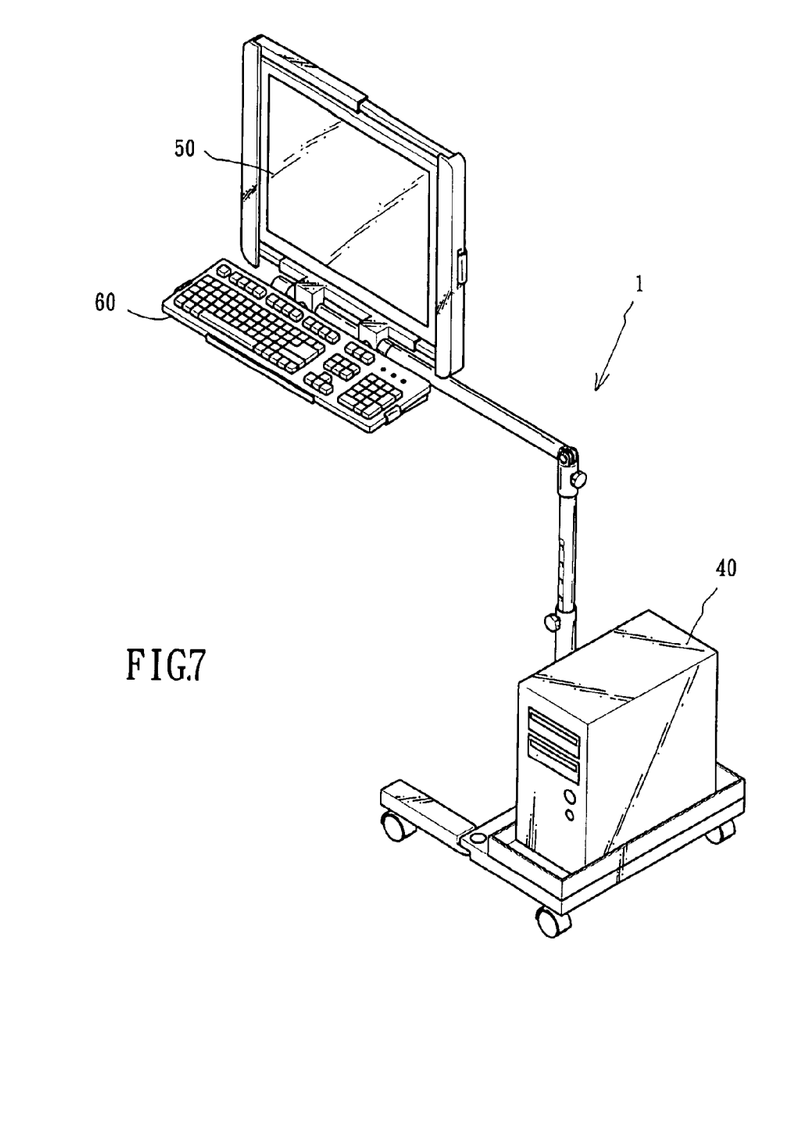
FIG. 7 is a perspective view of the preferred embodiment of the invention illustrating a practical application of the present invention.

The practical application of the present computer support stand 1 is shown in FIG. 7. A computer host 1 is placed on the accommodating trough 101 of the base 10. A monitor 50 is placed in between the left U-shaped frame 23 and the right U-shaped frame 24. And then adjust the left U-shaped frame 23 and the right U-shaped frame 24 so as to sandwich the monitor 50. Meanwhile, the monitor 50 is against the vertical flange portions 231 and 241. The two belts 25 connected support the back of the monitor 50 so as to tightly hold the monitor 50. Thereafter, a keyboard 60 is placed on the adjustment frame 30, and the limit member 33 is adjusted to sandwich and position the keyboard 60. Meanwhile, two sides of the keyboard 60 is held tightly by the holder 321 of the fillet 32. The installment is finished.

Figure 8:
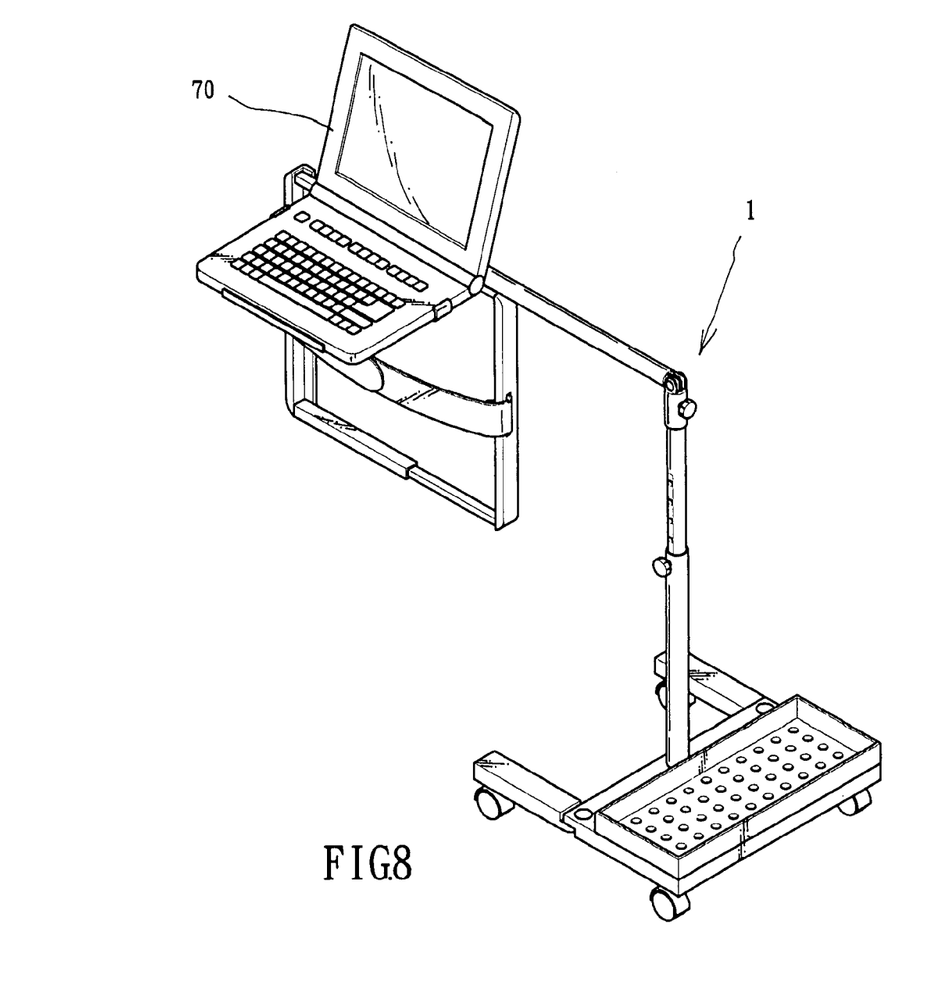
FIG. 8 is a perspective view of another preferred embodiment of the invention illustrating a practical application of the present invention.

The present invention is also applicable to laptop computers. Referring to FIG. 8, when a laptop computer 70 is used, the user only needs to use the adjustment frame 30 to hold and position the host portion of the laptop computer 70 tightly.

Figure 9:
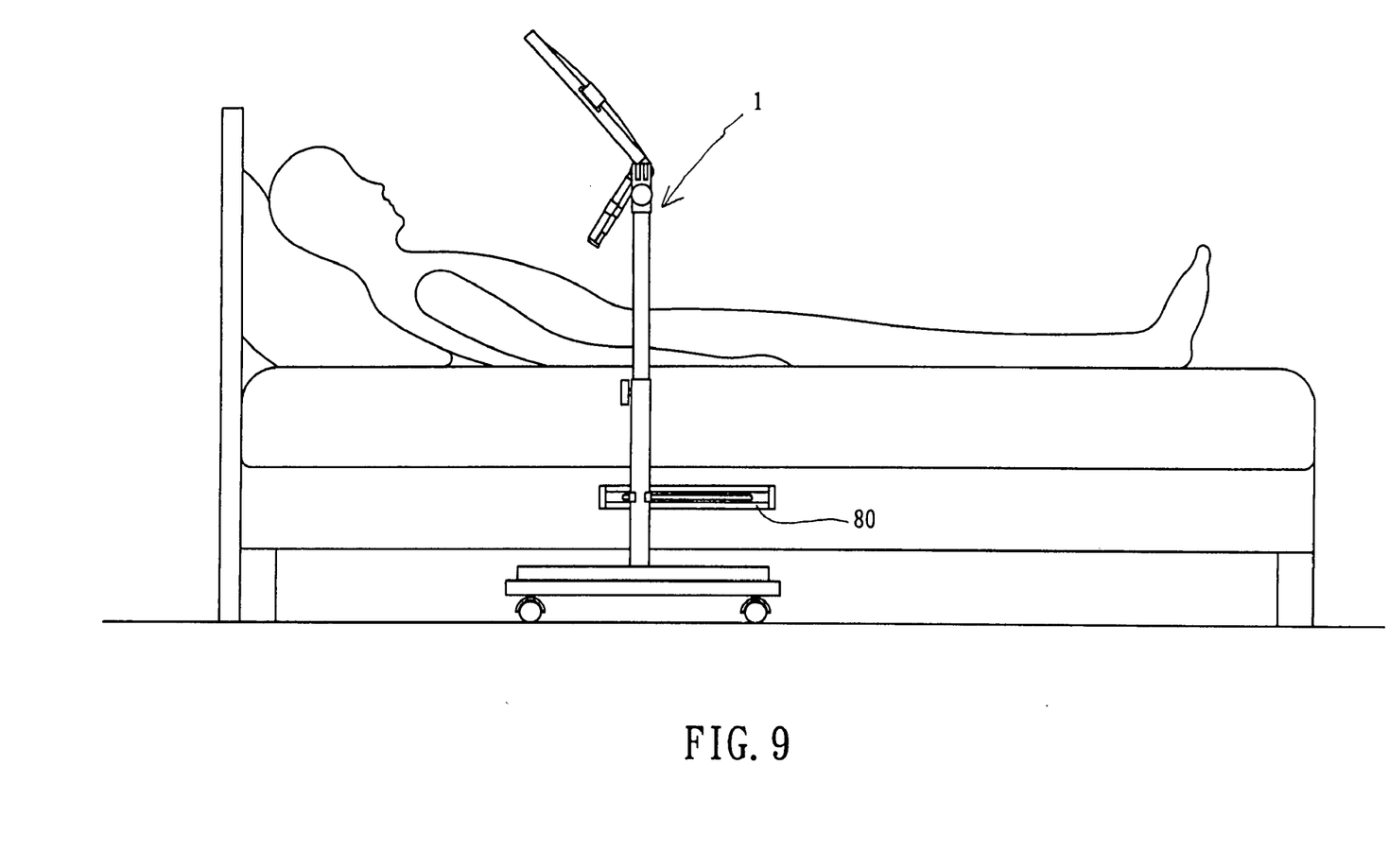
FIG. 9 is a perspective view of the preferred embodiment of the invention illustrating a practical application of the present invention.

Referring to FIG. 9, when a disabled user would like to operate a computer, the present computer support stand 1 is moved to the place near him or her. Then the user adjusts the length of retractable rod 13 and the angle of the rotation member 14 and the angle of the shaft rod 15, rotatable base member 20 and the U-shaped adjustment frame 30. Thereafter, the user can use the computer in the most comfortable posture.

Figure 10:
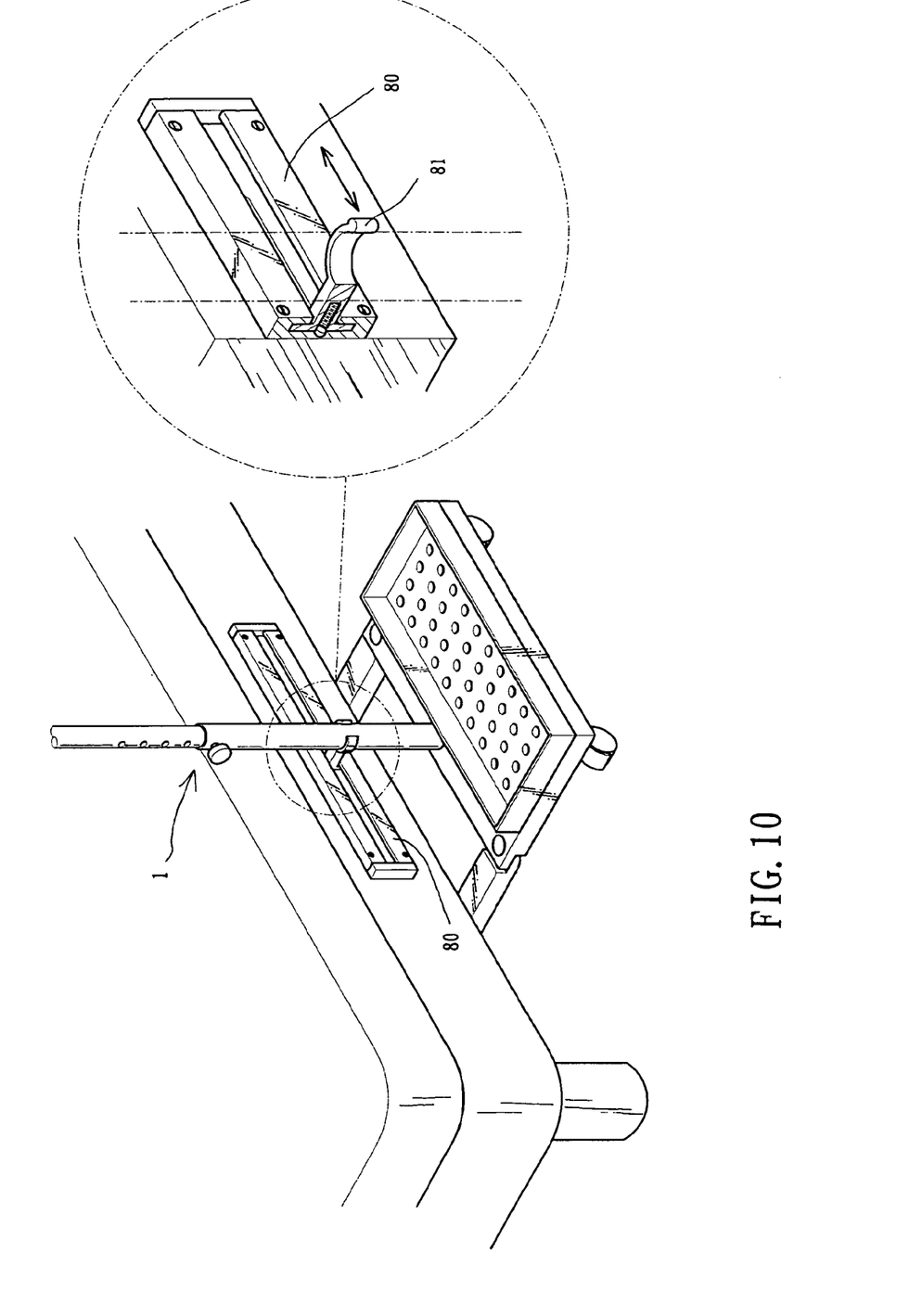
FIG. 10 is a preferred embodiment of the invention.

Further, in another embodiment, there is a rail 80 provided in the specific place of a sickbed and a clipping member 81 able to move laterally in the rail 80. In this way, by clipping the retractable rod 13 with the clipping member 81, the present computer support stand 1 is disabled to move casually or easily. On the other hand, if in the bottom of the sickbed there is no enough space to accommodate the swing rods 12 of the rotatable base member 20, the swing rods 12 can be rotated parallel to the sickbed to avoid this problem.

Figure 11:
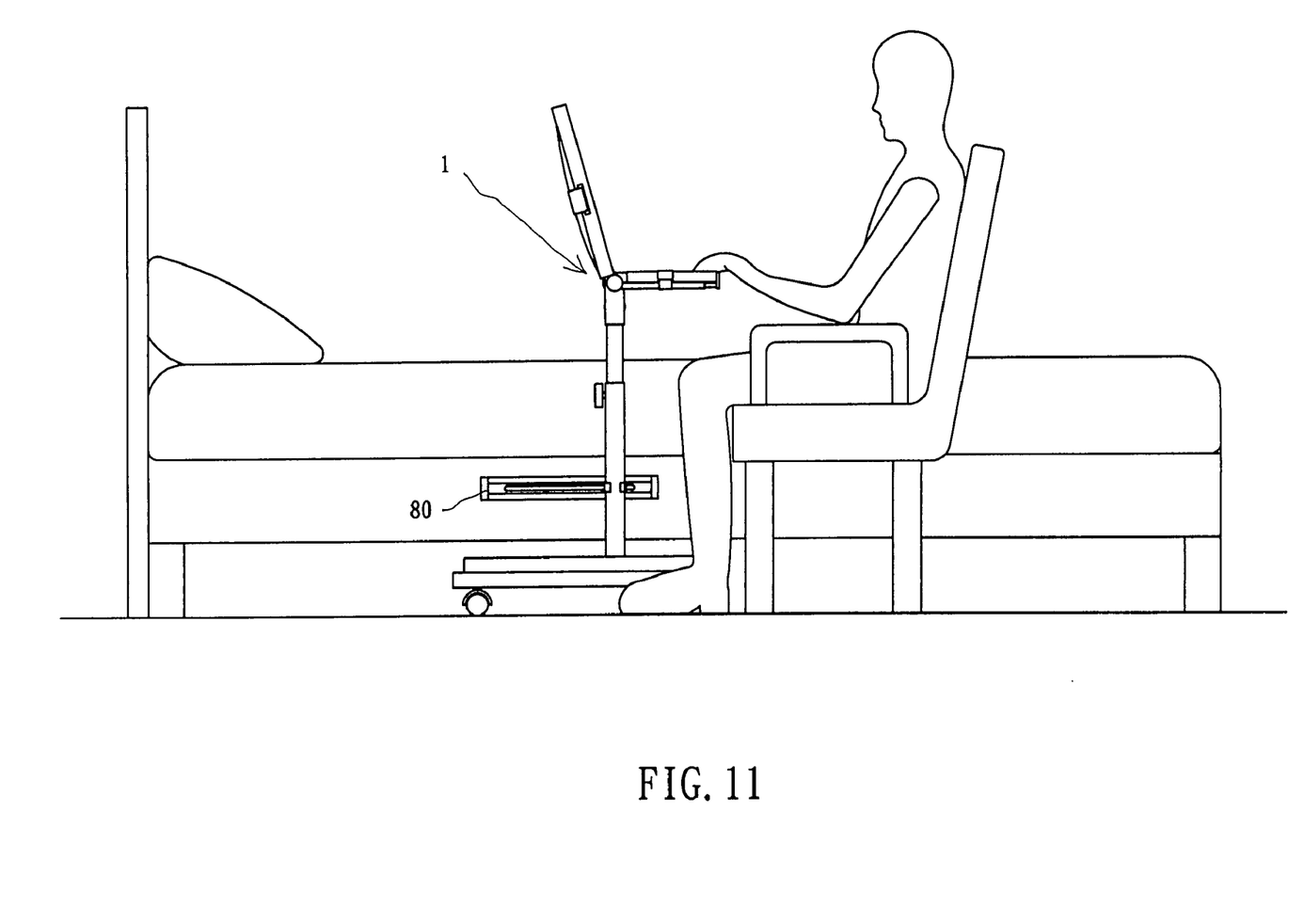
FIG. 11 is a partially perspective view of the preferred embodiment of the invention.
Figure 12:
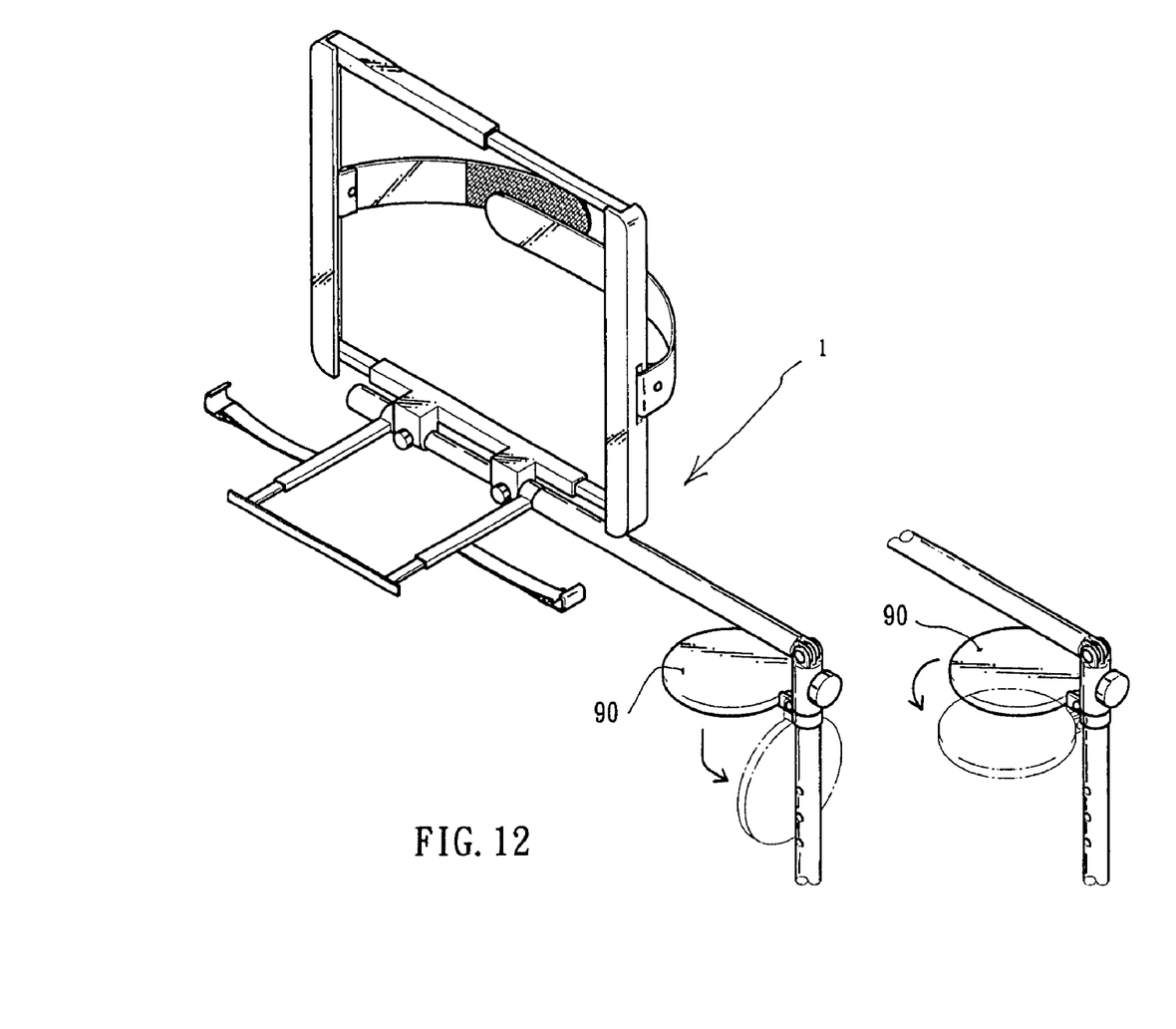
FIG. 12 is another preferred embodiment of the invention.

Referring to FIG. 11, if another user, such as a visitor, would like to use the present computer support stand 1, all the user has to do is to adjust the length of retractable rod 13 and the angle of the rotation member 14 and the angle of the shaft rod 15, rotatable base member 20 and the U-shaped adjustment frame 30. Of course, to further meet the requirements of the user, a mouse pad 90 is available optionally. The mouse pad 90 is attached to the second rod 132 of the retractable rod 13, used for placement of a mouse as shown in FIG. 12. In addition, the mouse pad 90 is foldable and thus it does not interfere with the movement or adjustment of the retractable rod 13, the rotation member 14 and the shaft rod 15.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A multifunctional adjustable computer support stand, comprising:

a base having an accommodating trough used to accommodate a computer host;

a pair of rolling wheels formed on corners of the bottom surface of the base;

two swing rods pivotally connected with opposite sides of the bottom surface of the base;

a retractable rod, including a first rod and a second rod passing through the first rod, wherein one end of the second rod is inserted into the first rod and thus the second rod is movable in the inner of the second rod, wherein the retractable rod is mounted on the base;

a rotation member having a pivot, connected with the second rod;

a support rod, passing through the rotation member, including a shaft rod extending form the one end of the support rod, wherein the support rod is pivotally connected with the pivot of the rotation member;

a rotatable base member, including a longer hollow portion and two separated shorter hollow portions;

a left U-shaped frame having one end and a right U-shaped frame having one end, wherein one end of the left U-shaped frame and one end of the right U-shaped frame are inserted into the longer hollow portion, respectively so that the distance between the right U-shaped frame, and the left U-shaped frame are adjustable to support a monitor;

an adjustment frame having a U-shape and including two vertical rods and a sleeve portion formed on each end of the vertical rods, wherein the shaft rod passes through both of the shorter hollow portions of the rotatable base member and the sleeve portions of the adjustment frame; and a lateral limit member, inserting into the ends far away from the sleeve portions of the vertical rods, adapted to support a keyboard.

2. The computer support stand according to claim 1, wherein said retractable rod further comprises a through hole formed on one end of the first rod and a screw, and several shallow indentations sequentially formed on the surface of second rod, the screw passing the through hole and against one of the shallow indentations so that said retractable rod is adjusted to the desired length.

3. The computer support stand according to claim 1, wherein said rotation member further comprises a positioning hole which corresponds to the positioning ring having a plurality of shallow indentations, through a screw passing through the positioning hole, the rotation member is fixed on one of the shallow indentations of the positioning ring so that the rotation member is rotated freely and be positioned by the screw.

4. The computer support stand according to claim 1, wherein said support rod further comprises a first end and a second end having a thread formed thereon, the first end being pivotally connected with the pivot of the rotation member so that the support rod is rotated freely.

5. The computer support stand according to claim 1, wherein said shaft rod further comprises two sets of inner fillisters and two sets of outer fillisters including a plurality of shallow indentations thereon.

6. The computer support stand according to claim 1, wherein said two separated shorter hollow portions, corresponding to the two sets of inner fillisters, used to let the shaft rod pass through, screws passing through the two separated shorter hollow portions is against the shallow indentations of the inner fillisters so that the rotatable base member is rotated, fixed and positioned.

7. The computer stand according to claim 1, wherein said left U-shaped frame and said right U-shaped frame further include respective vertical flange portions formed on the vertical portions, respective upper horizontal portions, respective lower horizontal portions and adjustable belts, the belts being connected with each other, the upper horizontal portions of the left U-shaped frame and the right U-shaped frame being connected with each other, both of the lower horizontal portions of the left U-shaped frame and the right U-shaped frame being inserted into the longer hollow portions.

8. The computer support stand according to claim 1, wherein said two vertical rods of the adjustment frame further comprises a sleeve portion corresponding to the outer fillisters on the shaft rod, so that via a screws passing through the holes and the shallow indentations formed in the outer fillisters, the adjustment frame is adjusted to a desired angle and fixed.

9. The computer support stand according to claims 1, wherein said vertical rods further comprises a fillet formed thereon, the fillet including a holder connected with a fastener so that the length of the fillet is adjustable.

10. The computer support stand according to claim 1, wherein said lateral limit member further comprises a limit spring provide in the inner of the vertical rods, used to provide the limit member with flexibility.

11. The computer support stand according to claim 1, further comprises a rail provided in the specific place of a sickbed and a clipping member able to move laterally in the rail, by clipping the retractable rod with the clipping member, the computer support stand being immobilized.

12. The computer support stand according to claim 1, further comprises a mouse pad attached to the second rod of the retractable rod, used for placement of a mouse.

13. The computer support stand according to claim 5, wherein said two separated shorter hollow portions, corresponding to the two sets of inner fillisters, used to let the shaft rod pass through, screws passing through the two separated shorter hollow portions are against the shallow indentations of the inner fillisters so that the rotatable base member is rotated, fixed and positioned.

14. The computer support stand according to claim 5, wherein said two vertical rods of the adjustment frame further comprises a sleeve portion corresponding to the outer fillisters on the shaft rod, so that via a screws passing through the holes and the shallow indentations formed in the outer fillisters, the adjustment frame is adjusted to a desired angle and fixed.

* * * * *